United States Patent
Marcolin

[19]

[11] Patent Number: 6,105,280
[45] Date of Patent: Aug. 22, 2000

[54] SHELL FOR SPORTS SHOES

[76] Inventor: Alessandro Marcolin, Via Chiesa 13, 31010 Crespignaga di Maser, Italy

[21] Appl. No.: 09/222,365

[22] Filed: Dec. 29, 1998

[30] Foreign Application Priority Data

Jan. 23, 1998 [IT] Italy ............................... TV980003 U

[51] Int. Cl.⁷ ............................... A43B 5/04; A43B 5/16; A43B 7/14
[52] U.S. Cl. ............................... 36/117.1; 36/115; 36/116; 36/117.3; 36/93
[58] Field of Search ...................... 36/25 R, 115, 36/116, 117.1, 117.3, 117.6, 117.9, 102, 117.5, 89, 92, 93

[56] References Cited

U.S. PATENT DOCUMENTS

| 4,928,407 | 5/1990 | Ottieri | 36/117.1 |
|---|---|---|---|
| 4,949,479 | 8/1990 | Ottieri | 36/117.1 |
| 4,955,149 | 9/1990 | Ottieri | 36/117.1 |
| 5,171,033 | 12/1992 | Olson et al. | 36/115 |
| 5,243,772 | 9/1993 | Francis et al. | 36/114 |
| 5,397,141 | 3/1995 | Hoshozaki et al. | 36/115 |
| 5,437,466 | 8/1995 | Meibock et al. | 36/115 |
| 5,595,006 | 1/1997 | Perrissoud et al. | 36/117.5 |
| 5,596,820 | 1/1997 | Edauw et al. | 36/115 |
| 5,678,833 | 10/1997 | Olson et al. | 36/115 |
| 5,768,807 | 6/1998 | Cacran et al. | 36/115 |
| 5,815,953 | 10/1998 | Kaufman et al. | 36/117.3 |
| 5,878,513 | 3/1999 | Annovi et al. | 36/115 |

FOREIGN PATENT DOCUMENTS

| 373479 | 1/1984 | Australia . |
|---|---|---|
| 2653309 | 4/1991 | France . |
| 668165 | 12/1988 | Switzerland . |

*Primary Examiner*—Paul T. Sewell
*Assistant Examiner*—Anthony Stashick
*Attorney, Agent, or Firm*—Guido Modiano; Albert Josif; Daniel O'Byrne

[57] ABSTRACT

A shell for sports shoes, particularly for Telemark skiing, which comprises a sole and a lateral surface which surrounds the foot of the user. A frame is rigidly coupled internally to the shell and has a foot resting surface and a toe cup which partially extends over the upper metatarsal region. On the resting surface and on the toe cup there are, respectively, at least one first transverse opening, arranged below the metatarsal region, and at least one second transverse opening, which lies above the metatarsal region. A transverse bridge, arranged in the region that lies to the rear of the metatarsus, is thus formed at the toe cup. The resulting shell is therefore highly flexible but torsionally rigid, making it easier for the user to ski.

9 Claims, 2 Drawing Sheets

SHELL FOR SPORTS SHOES

BACKGROUND OF THE INVENTION

The present invention relates to a shell for sports shoes, particularly for Telemark skiing.

Telemark skiing, also known as ski-touring, entails performing turns with the ski by bending both knees and lifting the heel of the uphill leg.

This kind of skiing therefore entails the need to provide shoes which have a flexible sole; this characteristic, however, leads to a second technical problem, which is the use of a shoe which has maximum torsional rigidity in order to be able to perform good ski control.

Moreover, another characteristic that the shoe must have for Telemark skiing is to be as lightweight as possible, since the physical movement consumes considerable energy.

Another problem that shoes used for Telemark skiing must solve is durability, since due to the continuous flexings there are regions, such as the metatarsal one, which are subject to considerable wear and to breakage if the shoes are made of leather or other natural material.

It is known to use, for other kinds of skiing but not for Telemark skiing, shells made of plastics which are substantially constituted by a sole from which a lateral surface protrudes and wraps around the entire foot of the user; a quarter is articulated to said shell.

The use of plastics allows to increase torsional rigidity but does not allow to achieve flexibility of the shell; this prevents the transfer of this technology to Telemark skiing, which as mentioned entails using non-synthetic material, which is subject to considerable wear and breakage, to make the shoe.

SUMMARY OF THE INVENTION

The aim of the present invention is therefore to solve the mentioned technical problems, eliminating the drawbacks of the prior art by providing a shell for sports shoes, particularly for Telemark skiing, which allows both to achieve optimum flexing during skiing and to ensure high torsional rigidity.

Within the scope of this aim, an important object is to provide a shell which is not subject to particular wear due to the flexing that occurs during sports practice.

Another important object is to provide a shell which is light in weight.

Another important object is to provide a shell which allows optimum ski control and therefore optimum transmission of efforts from the foot to said ski.

Another object is to provide a shell which is structurally simple and can be manufactured with conventional machines and equipment.

This aim, these objects and others which will become apparent hereinafter are achieved by a shell for sports shoes, comprising a sole and a lateral surface which surrounds the foot of the user, characterized in that a frame is rigidly coupled internally and/or externally thereto, said frame having a foot resting surface and a toe cup which partially affects the upper metatarsal region and on which there are respectively at least one first transverse opening, arranged below the metatarsal region, and at least one second transverse opening, which lies above the metatarsal region so as to form a transverse bridge which is arranged in the region that lies to the rear of the metatarsus.

BRIEF DESCRIPTION OF THE DRAWINGS

Further characteristics and advantages of the invention will become apparent from the detailed description of a particular embodiment, illustrated only by way of non-limitative example in the accompanying drawings, wherein.

DESCRIPTION OF THE PREFERRED EMBODIMENTS

Figure 1:
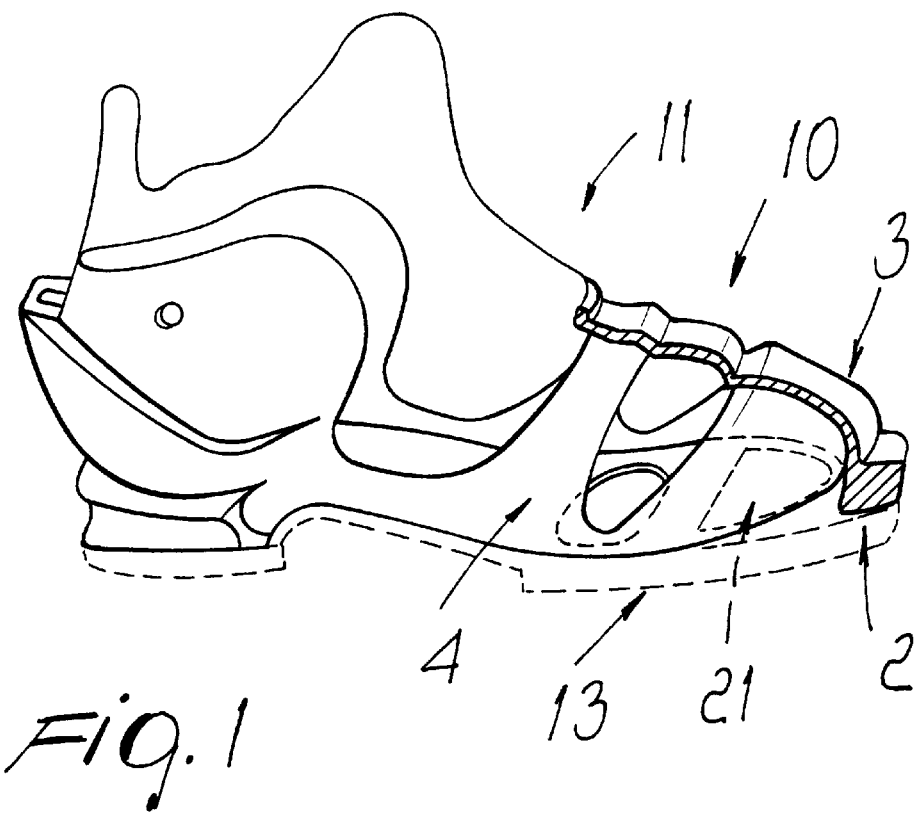
FIG. 1 is a partially sectional lateral perspective view of the shell, with the frame arranged inside it.
Figure 2:
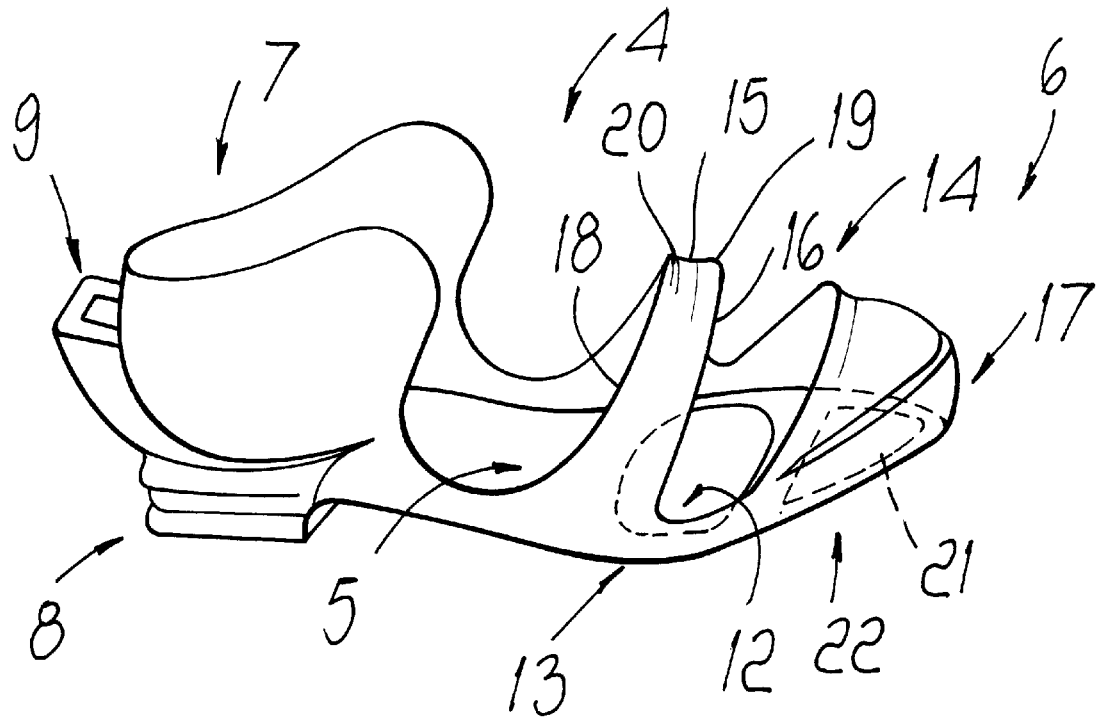
FIG. 2 is a lateral perspective view of the frame alone, disconnected from the shell.
Figure 3:
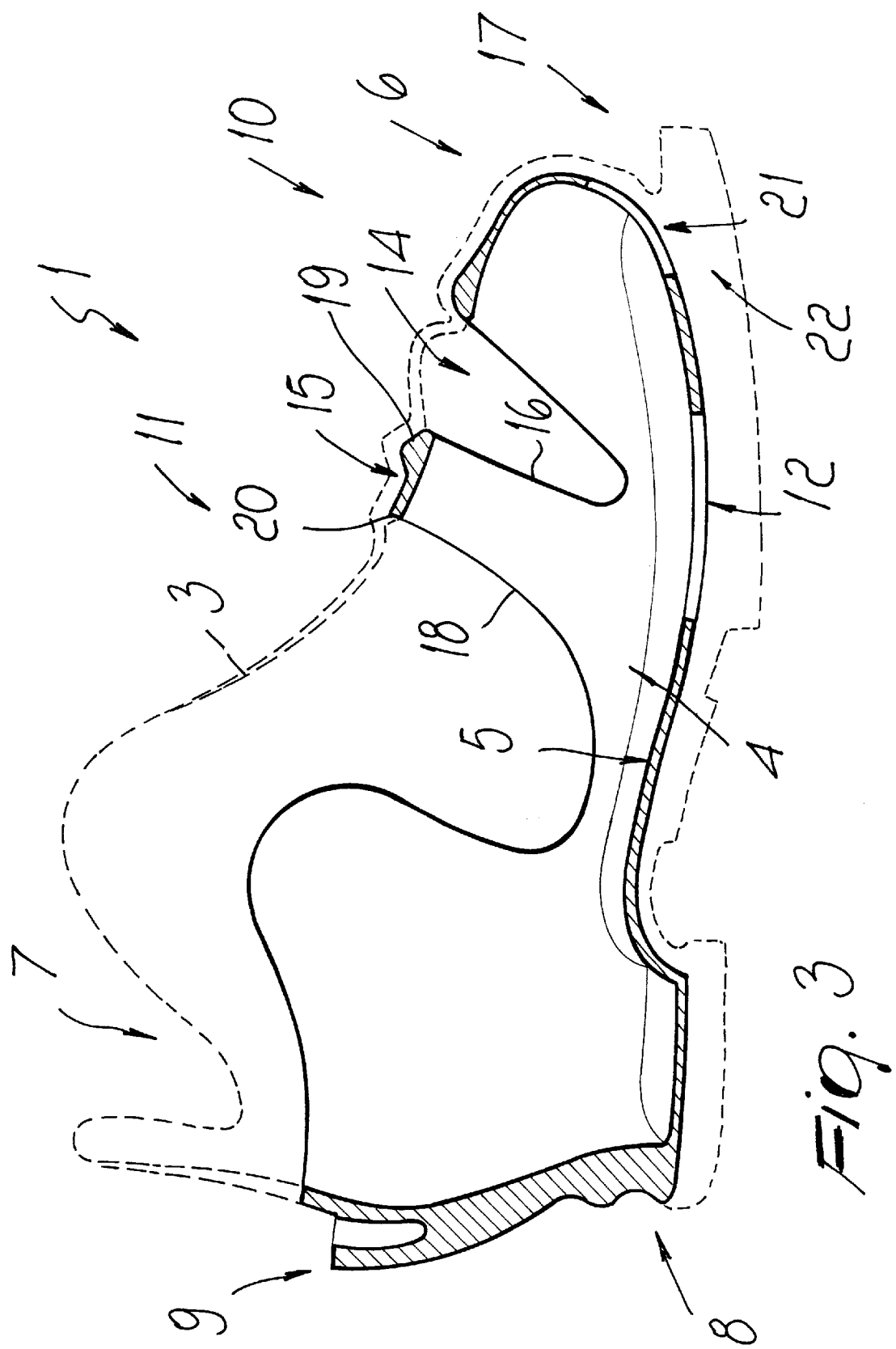
FIG. 3 is a sectional view, taken along a median longitudinal plane of the frame, also illustrating the presence of the shell structure.

With reference to the above Figures, the reference numeral 1 designates a shell for sports shoes, such as for example mountain boots or shoes for Telemark skiing.

Said shell has a sole 2 and a lateral surface 3 which surrounds the entire foot of the user and is obtained by using plastic material which has a limited thickness and a high degree of flexibility.

A frame, designated by the reference numeral 4, is rigidly coupled inside the shell, for example by overmolding said shell thereon.

Said frame is advantageously made of plastics and is more rigid than the material used to obtain the shell 1; said frame 4 has a load-bearing function and therefore has at least one foot resting surface 5 which is connected to a toe cup 6 and optionally a heel cup 7, both of which are adapted to surround the corresponding parts of the foot.

As an alternative, the heel cup 7 can be omitted and the surface 5 can affect at least the plantar arch and toe regions.

If the heel cup 7 is provided, it advantageously has a standard heel 8 and optional additional conventional means, such as for example a rear abutment tooth 9 for a quarter which is associated with the shell 1.

The toe cup 6 associated with the surface 5 at least partially affects the upper metatarsal region 10 approximately up to the vicinity of the instep region 11.

At least one first transverse opening 12 is provided at the foot resting surface 5 and lies below the metatarsal region 13.

At the toe cup 6 there is, again at the metatarsal region 13, a second transverse opening 14 which forms a transverse bridge 15 arranged in the region located to the rear of the metatarsus.

Said bridge 15 accordingly partially surrounds the upper metatarsal region 10 and forms a front perimetric edge 16, which is directed toward the tip 17 of the frame, and a rear perimetric edge 18, which is directed toward the heel 8.

At the front perimetric edge 16 there are, on said bridge 15, means for avoiding the inward folding of the shell 1 in the region above the metatarsus; said means are constituted by a first tab 19 which protrudes slightly beyond the plane of arrangement of the transverse bridge 15 and has a rounded perimetric edge.

Said shape therefore prevents, during flexing, the inward folding of the part of the shell 1 that lies at the second transverse opening 14 of the underlying frame 4 and also avoids shear effects.

At the rear perimetric edge 18 there are means for uniformly distributing the forces during the flexing of the shell; said means are constituted by a second tab 20 which protrudes toward the heel 8 and also protrudes slightly beyond the plane of arrangement of said transverse bridge 15; this allows, during flexing, to distribute the forces along the entire edge of the bridge.

The frame 4 also has a third opening 21 which is formed at the surface 5 in the region 22 where the toes rest; the presence of said third opening, which is advantageous during Telemark skiing but not necessary, is useful because when the shell begins to flex it allows the foot to transmit force in an optimum manner, thus applying optimum pressure to the underlying plate of the binding associated with the ski and therefore maintaining good control.

It has thus been observed that the invention has achieved the intended aim and objects, a shell having been devised which, despite being made of plastics, can be used in Telemark skiing, allowing to achieve both optimum flexing and optimum torsional rigidity.

The illustrated solution furthermore allows to provide a shoe which has a low weight and is not subject to breakage due to the continuous flexing actions that occur during skiing, allowing to provide, for example, the frame by using a more rigid material and the shell by using a softer material.

The presence of the transverse bridge and of the first and second transverse openings allow optimum deformation of the frame in order to achieve flexing although said frame is structurally rigid.

The materials and the dimensions that constitute the individual components of the structure, such as for example the extension and shape of the first and second transverse openings, of the transverse bridge, of the optional third opening and the extension of the foot resting surface 5, may of course be the most pertinent according to the specific requirements.

The disclosures in Italian Patent Application No. TV98U000003 from which this application claims priority are incorporated herein by reference.

What is claimed is:

1. A shell for sports shoes, including:

a sole;

a lateral s connected to the sole for surrounding a foot of a user, said lateral surface being made of flexible plastic material; and a frame being rigidly coupled inside said lateral surface and said sole, said frame being made of plastics and being more than said lateral surface, and said frame comprising:

a foot resting surface;

a metatarsal region for substantially surrounding the metatarsus of the foot of a user;

a toe cup which partially forms the metatarsal region;

at least one first transverse opening located at said toe cup and arranged below the metatarsal region;

at least one second transverse opening, which lies above the metatarsal region;

a transverse bridge, formed adjacent said second opening, the bridge being arranged in a region of the frame that lies at a rear part of the metatarsal region.

2. The shell of claim 1, comprising a toe resting region and a third opening, said third opening being formed on said foot resting surface in the toe resting region.

3. The shell of claim 2, wherein said transverse bridge comprises folding prevention means to avoid inward folding of said shell in a region above the metatarsal region of the frame.

4. The shell of claim 3, wherein said transverse bridge has force distributing means for uniformly distributing flexing forces.

5. The shell of claim 4, wherein said lateral surface and said sole are overmolded about said frame.

6. The shell of claim 5, comprising an instep region, said toe cup partially extending over the upper metatarsal region up to the vicinity of the instep region.

7. The shell of claim 5, wherein said bridge partially surrounds said metatarsal region and forms a front perimetric edge thereof being directed toward a tip part of said frame, and a rear perimetric edge, which is directed toward a heel part thereof.

8. The shell of claim 7, wherein, at said front perimetric edge, the folding prevention means are provided which are constituted by a first tab, said first tab protruding frontally and slightly beyond a plane of arrangement of said bridge and having a rounded perimetric edge.

9. The shell of claim 8, wherein, at said rear perimetric edge, the force distributing means are provided which are constituted by a second tab, said second tab being directed toward said heel part and also protruding slightly beyond the plane of arrangement of said transverse bridge.

* * * * *